(No Model.) 2 Sheets—Sheet 1.

A. M. STONER.
VELOCIPEDE.

No. 378,631. Patented Feb. 28, 1888.

WITNESSES:
D. C. Reusch.
C. Sedgwick.

INVENTOR:
A. M. Stoner.
BY Munn & Co.
ATTORNEYS.

(No Model.) 2 Sheets—Sheet 2.

A. M. STONER.
VELOCIPEDE.

No. 378,631. Patented Feb. 28, 1888.

WITNESSES:
D. C. Reusch.
C. Sedgwick.

INVENTOR:
A. M. Stoner
BY Munn & Co.
ATTORNEYS.

UNITED STATES PATENT OFFICE.

ALLEN M. STONER, OF TOPEKA, KANSAS.

VELOCIPEDE.

SPECIFICATION forming part of Letters Patent No. 378,631, dated February 28, 1888.

Application filed July 1, 1887. Serial No. 243,089. (No model.)

*To all whom it may concern:*

Be it known that I, ALLEN M. STONER, of Topeka, in the county of Shawnee and State of Kansas, have invented a new and Improved Quadricycle, of which the following is a full, clear, and exact description.

This invention relates to a novel form of vehicle wherein the rear axle is arranged so that it may support a vehicle box or body, while the forward axle is connected to the said vehicle-body by a novel form of swinging connection, said forward axle being arranged so that it may be driven by treadles which are operated by the rider of the vehicle, and this forward axle is also arranged so that it may be turned to cross the central longitudinal line of the vehicle at such angle as may be desired to carry the vehicle to the right or to the left.

Reference is to be had to the accompanying drawings, forming a part of this specification, in which similar figures of reference indicate corresponding parts in all the views.

Figure 1:
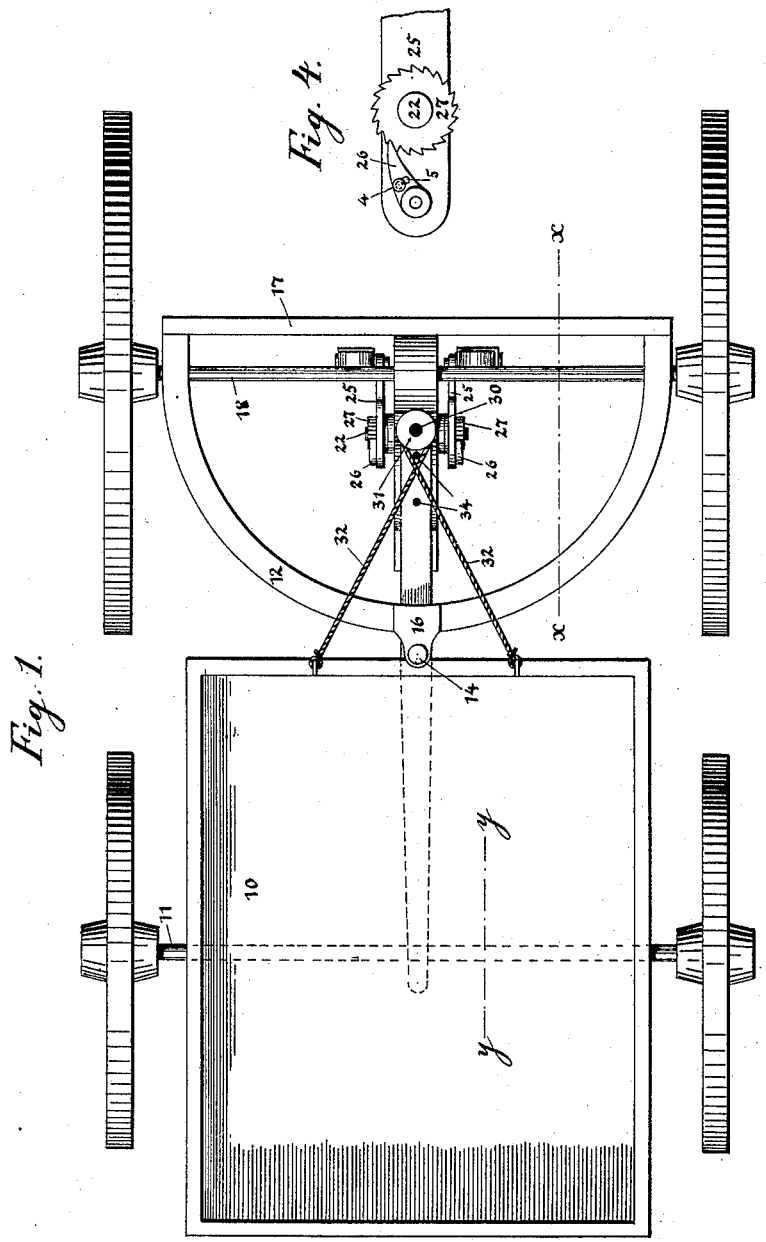
Figures 2, 3:
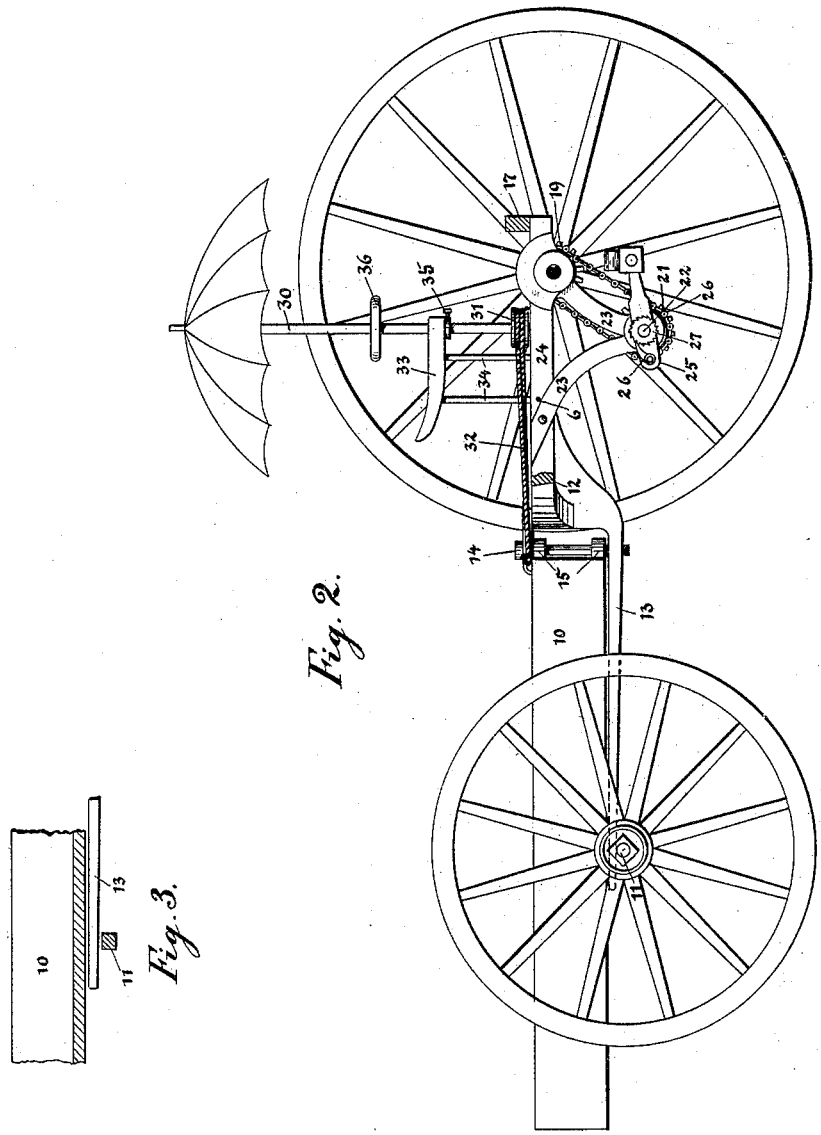

Figure 1 is a plan view of my improved quadricycle. Fig. 2 is a side view of the same in partial section, taken on line *x x* of Fig. 1. Fig. 3 is a detail view taken upon a line corresponding with the line *y y* of Fig. 1, and Fig. 4 is a detail view illustrating the construction of one of the treadle-levers.

In the drawings, 10 represents a vehicle box or body which is mounted in the ordinary manner upon a hind or rear axle, 11. To the forward end of the body 10, I connect a semi-circular bar, 12, which is made integral with or rigidly connected to a rearwardly-extending tongue, 13, the connection between said bar 12 and the vehicle-body 10 being established by means of a bolt, 14, which passes through eyes 15, that are carried by the vehicle-body, and through an aperture formed in a projection, 16, that is secured to the bar 12, the lower end of the bolt 14 passing through the body of the tongue 13. The forward ends of the semicircular bar 12 are connected by a cross-bar, 17, and just to the rear of this cross-bar the forward axle, 18, is connected to the bar 12, one of the wheels of said axle being rigidly connected thereto. Upon the axle 18 I mount a sprocket-wheel, 19, over which there passes a driving chain or strap, 20, which is driven by a sprocket-wheel, 21, that is mounted on a short shaft, 22, that is supported by brackets 23, which extend downward from either side of the forwardly-extending section 24 of the tongue 13.

Upon the shaft 22, I loosely mount two treadle-levers, 25, and these levers each carry gravity-pawls 26, said pawls being pivotally connected to the short arms of the levers 25, the pawls being guided as to position by short pins 4, which extend through oval or elongated slots 5, that are formed in the pawl-bodies. These pawls engage with ratchets 27, which are rigidly connected to the shaft 22, so that as the treadle-levers 25 are forced downward the pawls will engage with the ratchets and the shaft 22, and consequently the axle 18 will be moved forward; but when the treadles are raised to their proper position the pawls will slip upon the ratchets, to fall back, however, into engagement with the teeth of the ratchet when the treadle is again forced downward, the pins 4 acting at this time to prevent the pawls from being thrown over so that they will not return by their own weight to engage with the ratchet-teeth.

Upon the forward section, 24, of the tongue 13, I mount a vertical shaft, 30, which carries a drum or sheave, 31, over which there is passed a cord, strap, or chain, 32, the ends of this chain being connected to the vehicle-body 10. The shaft 30 passes through the forward portion of the seat 33, said seat resting upon a collar, 35, that is held to the shaft 30 by a set-screw, as shown in Fig. 2, the main body of the seat being supported by rods or standards 34, which pass down through the section 24, and are held in such position as may be desired by set-screws 6, which pass through the section 24 to bear against the rods or standards 34.

From the construction described it will be seen that the seat may be adjusted to suit the person of the rider and that the vehicle may be guided by turning the shaft 30 in a proper direction, this shaft being provided with a hand-wheel, 36.

As probably best shown in Fig. 3 the extreme rear end of the tongue 13 rests between the bottom of the vehicle-body and the upper face of the rear axle, the two parts named forming a guide for said tongue, and the tongue itself acting as a brace and thereby relieving the swinging connection between the vehicle-body and the forward portion of the vehicle from any undue strain.

Having thus fully described my invention, I claim as new and desire to secure by Letters Patent—

1. The combination, with a rear axle, of a vehicle-body supported thereby, a forward axle-frame pivotally connected to the vehicle-body, a shaft carrying a drum or sheave supported by said frame, and a flexible connecting device wound about the drum or sheave and connected to the vehicle-body, substantially as described.

2. The combination, with an axle, of a vehicle-body supported thereby, a forward axle-supporting frame pivotally connected to the vehicle-body, a rearwardly-extending tongue carried by said frame and arranged to pass beneath the vehicle-body and above a guide, such as the rear axle, a sprocket-wheel mounted on the forward axle, a driving-shaft, a second sprocket-wheel carried by the driving-shaft, connection between said sprocket-wheel and the sprocket-wheel of the forward axle, treadle-levers loosely mounted on the driving-shaft, ratchets connected to the treadle-levers, and pawls carried by the treadle-levers and arranged to engage said ratchets, substantially as described.

3. The combination, with a driving-shaft provided with ratchets, of treadle-levers loosely mounted on said shaft, pawls pivotally connected to the treadle-levers, and limit-pins carried by the treadle-levers and entering slots that are formed in the pawls, substantially as described.

4. In a quadricycle, the combination, with a vehicle-body and its supporting-axle, of a forward axle, a frame by which said forward axle is carried, a bolt by which said frame is connected to the vehicle-body, a driving mechanism, and a seat adjustably connected to the forward axle-supporting frame, substantially as described.

ALLEN M. STONER.

Witnesses:
S. ETTLINGER,
H. K. DANENHOWER.